March 11, 1930.　　　J. KAISER　　　1,750,318

CABLE SUPPORT INSULATOR

Filed Nov. 23, 1928

INVENTOR
John Kaiser
BY
ATTORNEY

Patented Mar. 11, 1930

1,750,318

UNITED STATES PATENT OFFICE

JOHN KAISER, OF DOBSINA, CZECHOSLOVAKIA

CABLE-SUPPORT INSULATOR

Application filed November 23, 1928. Serial No. 321,294.

This invention relates generally to a new and useful device in the nature of an insulation bell especially adapted for the purpose of providing an insulation medium for electric transmission wire and the like at the points of supports of the said wires.

The object of the invention is to provide an insulation bell of novel construction and arrangement of parts embodying certain new and adjustable features hereinafter more fully described, claimed and illustrated in the accompanying drawing.

Figure 1:
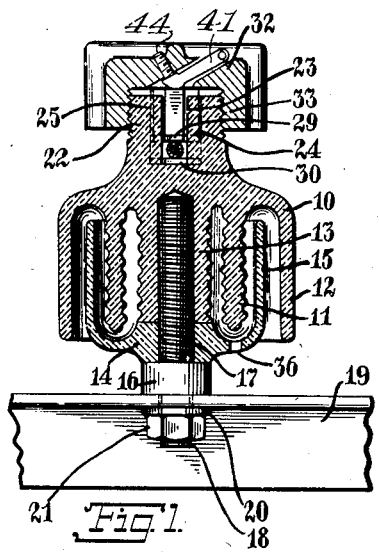
Fig. 1 is a vertical central sectional view of my improved insulation bell.
Figure 2:
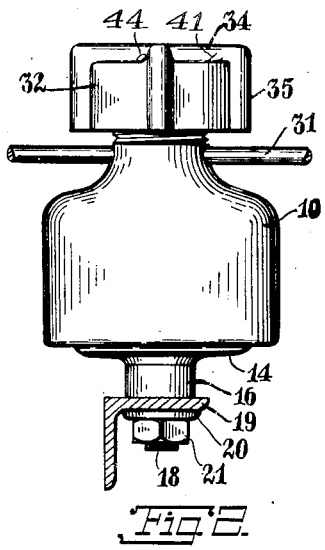
Fig. 2 is a side elevational view thereof.
Figure 3:
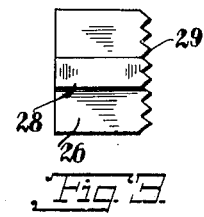
Fig. 3 is an enlarged side elevational detail view of the clamping block as embodied in my improved device.
Figure 4:
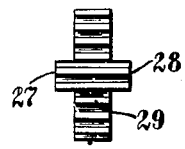
Fig. 4 is a bottom plan view thereof.

As here embodied my improved insulation bell comprises a body member 10, somewhat of bell shape construction, and provided with lower extended outer and inner ring shape elements 11 and 12, and provided with an axial extended element 13. The inner ring shape element 13 is provided with an irregular or "wavy" periphery for the purpose as hereinafter set forth. The lower member 14, of cup shape construction is provided with an extended ring shaped element 15, adapted to be positioned intermediate the above mentioned outer and inner ring shaped elements 11 and 12 of the said body member. The lower member 14 has formed therein, at the base of the extended element 15, an aperture 36, for the purpose as hereinafter set forth.

The stud 16 is provided with an intermediate enlarged or flanged portion and is also provided with an upwardly extended threaded element 17 adapted to engage in threaded apertures formed in the above mentioned lower member and body member, as a means of securely holding the latter two mentioned members in place so as to permit the extended element of the said two latter mentioned members to be positioned as above set forth. The stud 16 is provided with a downwardly extended threaded element 18, adapted to engage in an aperture formed in the support 19, preferably of angle iron construction or the like. The washer 20 is mounted on the extended element 18 of the said stud, the usual nut 21 is threadedly mounted on the extended element 18 of the said stud, as a means of securely holding my improved device in place on the said support.

The body member 10 is provided with an upper extended element 22 having formed therein a transverse opening 23, provided with central side extended recesses 24 and 25, adapted to slidably receive the clamping block 26, which is provided with central side extended elements 27 and 28, adapted to slidably engage in the said recesses 24 and 25, as a means of slidably holding the said clamping block in place in the extended element 20 of the body member. The bottom portions or bases of the clamping block 26 and the opening 24 formed in the extended element 20 of the body member 10, are formed or cut serrated as at 29 and 30, respectively, as a means of engaging the electric wire 31, extended through the said opening 24, directly below the clamping block 26.

The head 32 is provided with a threaded opening 33, adapted to engage the threaded periphery of the extended element 22 of the body member 10, as a means of securely holding the clamping member 26 in place, as above set forth, for the purpose as above described. The head 32 is provided with a plurality of radial ribs, extended downwardly as at 35, as a means of providing a suitable grip to facilitate the manual tightening of the head so as to securely hold the clamping member in place.

It is understood that the body member 10 is constructed of any suitable insulating material such as glass, porcelain or the like and that the lower member 14 may be constructed of similar materials, or may be constructed of a mixture consisting of four parts of camphor and one part of a cement mixture molded on the stud 16.

It is also understood that a mixture consisting of four parts of camphor and one part of cement mixture is poured in the lower portion of the opening 23 formed in the extended element 20 of the body member 10, prior to the positioning of the clamping member 26, for the purpose of permitting the said mixture to combine or consolidate with the oxidized portion of the wire 31, as a means of securing a firm or solid holding medium for the said wire.

The above described construction is also such as will permit moisture, vapor or the like to collect on the irregular periphery of the inner extended elements 11 of the body member 10, and condensate, the said condensation dripping from the extremities of the said inner extended elements and draining through the aperture 36 formed in the lower member 14, as a means of preventing the said moisture and vapor from coming in contact with the wire 31, for the purpose of preventing a short circuit.

Figure 5:
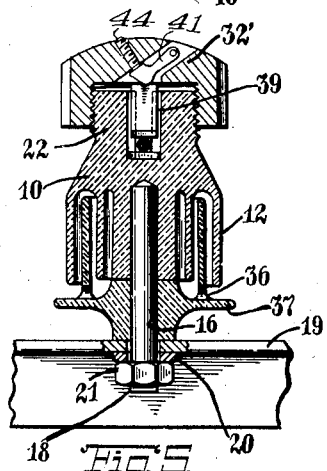
Fig. 5 is a similar sectional view to that shown in Fig. 1, illustrating a modification of my improved device.
Figure 6:
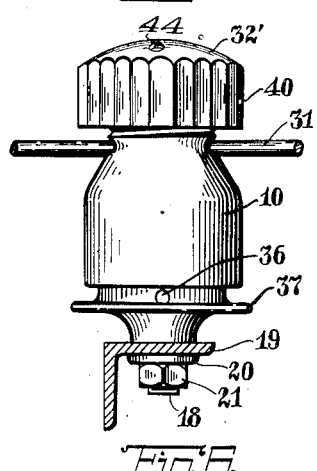
Fig. 6 is a side elevational view thereof.
Figure 7:
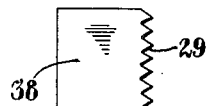
Fig. 7 is a side elevational view of the clamping block as embodied in the modification of my improved device.
Figure 8:
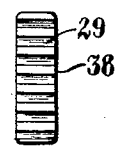
Fig. 8 is a bottom plan view thereof.
Figure 9:
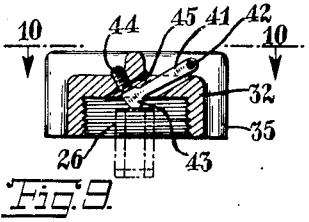
Fig. 9 is a vertical central sectional view of the movable head, per se, shown in Fig. 1.
Figure 11:
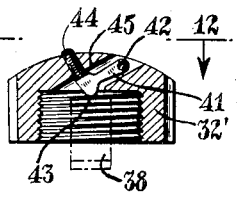
Fig. 11 is a vertical central sectional view of the removable head, per se, shown in Fig. 5.
Figure 12:
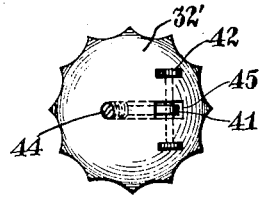
Fig. 12 is a top plan view thereof.
Figure 10:
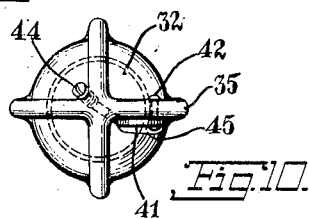
Fig. 10 is a top plan view thereof.

In Figs. 5, 6, 7 and 8 of the accompanying drawing, I have shown the lower member 14 provided with an intermediate flanged element 37, or guard, extended horizontally somewhat beyond the outer extended element 12 of the above mentioned body member 10, as a means of partially preventing moisture, vapor and the like from coming in contact with the inner portions of the body member 10, for the purpose as above set forth. The clamping block 38 is of rectangular block shaped construction and is adapted to slidably engage in an opening 39 formed in the extended element 22 of the body member 10. The head 32' is of dome shaped construction and is provided with a notched periphery 40, provided for the purpose of providing a suitable grip for manually tightening the said head 32'.

The engaging member 41 is pivotally secured at one extremity thereof, as at 42, to the head 32, and provided with an enlarged free extremity 43, held in engagement with the clamping block 26, by means of the threaded member 44, a set screw or the like threadedly mounted in the head 32 and adapted to engage the free extremity of the said engaging member. An opening 45 is formed in the said head adapted to freely receive the engaging member 41.

The above described construction is such as will permit the clamping block to be securely held in place, as above set forth, in event a wire of comparatively smaller diameter is used.

I have shown a similar engaging member similarly mounted in the head 32' and similarly adjusted for the purpose as above set forth.

Having thus described my invention, what I claim as new and desire to secure by United States Letters Patent is:—

1. In an insulation bell of the class described, a body member with an extended element having a transverse opening for the passage of a wire, a clamping block within the opening for engaging against the wire, a head member connected with said extended element for holding the block in place, an engaging member pivoted on the head member and engaging said clamping block, and a set screw threadedly engaging in the head member and against the engaging member for holding the clamping block against said wire.

2. In an insulation bell of the class described, a body member with an extended element having a transverse opening for the passage of a wire, a clamping block within the opening for engaging against the wire, a head member connected with said extended element for holding the block in place, an engaging member pivoted on the head member and engaging said clamping block, and manually operable, adjustable means for abutting said engaging member for holding the clamping block against said wire.

In testimony whereof I have affixed my signature.

JOHN KAISER.